(12) United States Patent
Jones et al.

(10) Patent No.: US 7,568,540 B1
(45) Date of Patent: Aug. 4, 2009

(54) SUPERCHARGED MOTORCYCLE

(75) Inventors: Daniel W. Jones, Lenexa, KS (US);
Aaron D. Kuehl, Prairie Village, KS (US); Lane York, Shawnee, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 450 days.

(21) Appl. No.: 11/379,335

(22) Filed: Apr. 19, 2006

Related U.S. Application Data

(62) Division of application No. 10/605,880, filed on Nov. 3, 2003, now Pat. No. 7,051,824.

(51) Int. Cl.
*B62D 61/02* (2006.01)
(52) U.S. Cl. ...................... 180/68.3; 180/219
(58) Field of Classification Search ........... 180/219, 180/68.3; 123/559.1
See application file for complete search history.

(56) References Cited

U.S. PATENT DOCUMENTS

| | | | | | |
|---|---|---|---|---|---|
| 1,954,436 | A | * | 4/1934 | Waseige | 74/359 |
| 2,159,278 | A | * | 5/1939 | Lesley | 415/74 |
| 2,377,199 | A | * | 5/1945 | Adams et al. | 415/26 |
| 5,263,463 | A | * | 11/1993 | Perry | 123/559.1 |

* cited by examiner

*Primary Examiner*—Christopher P Ellis
*Assistant Examiner*—Bridget Avery

(74) *Attorney, Agent, or Firm*—Hovey Williams LLP

(57) ABSTRACT

A supercharged motorcycle (10) configured for mounted operation by a rider (R) is disclosed. The supercharged motorcycle (10) broadly includes a motorcycle (12) and an air induction system (14) configured to deliver compressed induction fluid to the intake manifold (48) of the motorcycle's engine (18). The air induction system (14) broadly includes an air intake assembly (62) for receiving ambient air and delivering it downstream, a supercharger (64) in downstream communication with the air intake assembly (62) for compressing the air, an air delivery assembly (66) for delivering the compressed air to the engine (18), and a drive assembly (68) for powering the supercharger (64) off of the drive train (44). The entire air induction system (14) is positioned entirely outside of the leg-receiving areas (ALR) defined by the motorcycle (12) so as to not engage the rider's legs (L) and feet (F), when the rider (R) is mounted on the seat (34) in the normal operating position. Driving the air induction system (14) off of one or more components of the drive train (44) cooperates with the forward positioning of the supercharger (64) and the sleek configuration of the drive assembly (68) extending there between to provide an air induction system (14) that does not undesirably alter the overall appearance or sound of the motorcycle 12 and does not interfere with the preferred operation thereof as is preferred by motorcycle riders, particularly Harley-Davidson® riders. A preferred alternative embodiment of the power take-off subassembly for an air induction system for a supercharged motorcycle is also disclosed in the supercharged motorcycle (400). The motorcycle (400) includes a breakaway coupler assembly (408) that enables the motorcycle's drive train to continue operation in the event of catastrophic failure of the air induction system.

14 Claims, 9 Drawing Sheets

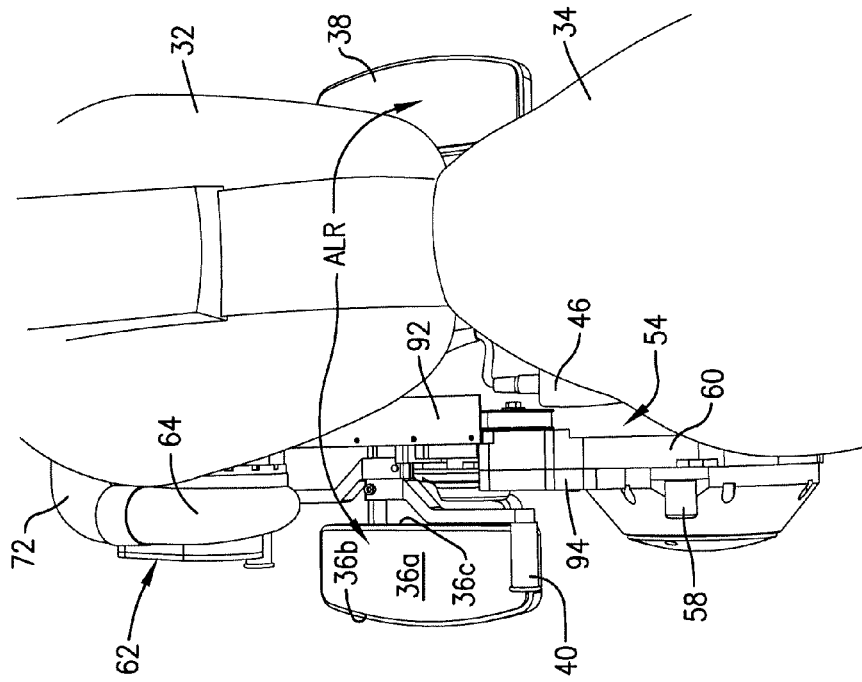
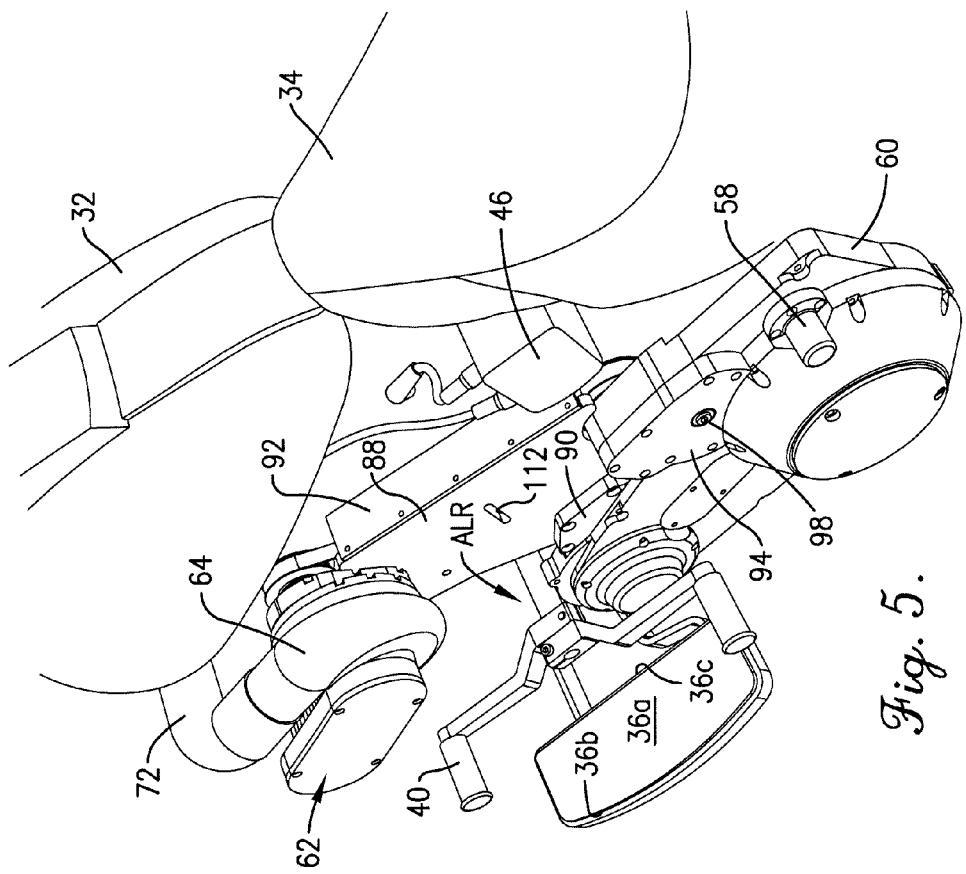

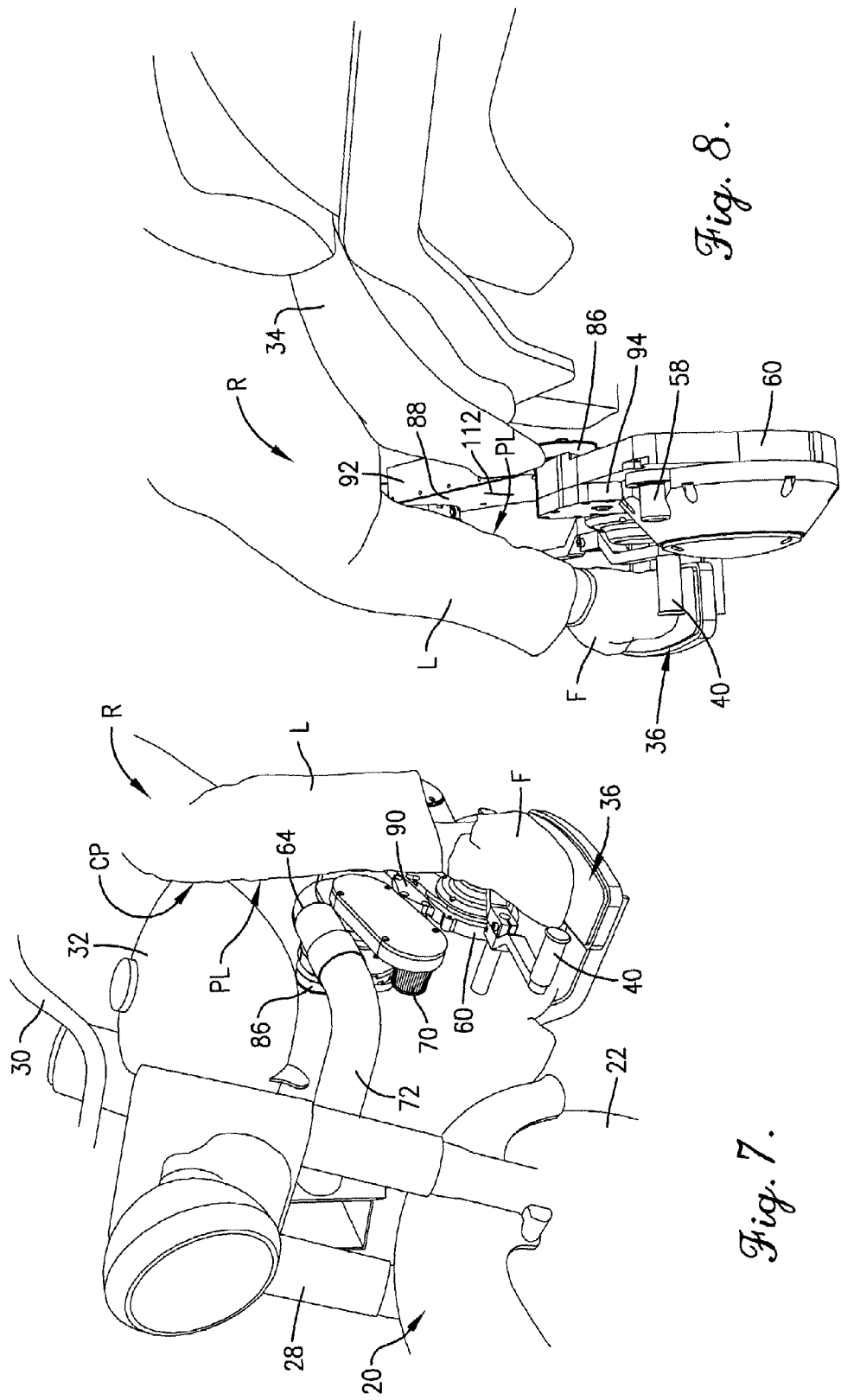

SUPERCHARGED MOTORCYCLE

RELATED APPLICATION

This is a divisional application of application Ser. No. 10/605,880, filed Nov. 3, 2003 and entitled SUPERCHARGED MOTORCYCLE, which is hereby incorporated by reference herein.

BACKGROUND OF THE INVENTION

1. Field of the Invention

The present invention relates generally to superchargers for providing increased airflow to the engine of a motorcycle, such as a V-twin engine typically found on a Harley-Davidson® motorcycle. More specifically, the present invention concerns an improved drive assembly that compactly spans the drive train components of the motorcycle while remaining entirely inboard of, and thus does not interfere with, the rider's anatomical engagement with the motorcycle. The unique drive assembly enables the supercharger to be positioned in the otherwise unused space in the fore area of the motorcycle chassis and can be driven off of a breakaway power take-off drivingly communicating with a selected component of the generally aftward drive train of the motorcycle.

2. Discussion of Prior Art

It is known in the art to supercharge an internal combustion engine to provide increased airflow to the engine to thereby enhance the power output of the engine. There are several types of superchargers known in the art, including, for example, Roots-type superchargers and centrifugal superchargers, both of which are driven off of the crankshaft of the engine, as well as turbochargers that are driven off of the engine's exhaust. One exemplary centrifugal supercharger well advanced in the art and particularly resistant to failure is disclosed in the copending U.S. application patent Ser. No. 10/641,619 entitled CENTRIFUGAL COMPRESSOR WITH IMPROVED LUBRICATION SYSTEM FOR GEAR-TYPE TRANSMISSION, filed Aug. 14, 2003 (the "Jones '619 application"), having a common inventor and assignee with the present application and hereby incorporated by reference herein.

It is also known in the art to supercharge a motorcycle engine, including the distinctive V-twin engine design found on Harley-Davidson® motorcycles. However, motorcycle engines and particularly Harley-Davidson® V-twin motorcycle engines provide several problems for supercharging applications. For example, superchargers are typically driven off of the engine's crankshaft, however, the crankshaft is typically positioned adjacent the footboard and foot controls of the motorcycle and therefore there is very limited space in and around the crankshaft in which to position drive components. Therefore, in order to place the drive components and/or the supercharger itself in the crowded area around the crankshaft, the components can undesirably alter or interfere with the rider's otherwise normal, comfortable operating position and/or the rider's ability to readily manipulate the foot controls. Additionally, it has been determined that Harley-Davidson® owners in particular are loathe to modify their motorcycles in any way that will materially alter or affect the original distinctive appearance and sound of the motorcycle. Furthermore, prior art superchargers, particularly superchargers that do not utilize multiple bearing arrangements or a self-contained dedicated lubrication system, can be subject to premature failure, or failure prior to the life expectancy of the motorcycle's engine, particularly where the drive assembly is not maintained within very tight tolerances. Failure of these prior art superchargers can be problematic as it may in turn cause catastrophic, and thus costly, engine failure as well. The potential for such engine failure is exacerbated where the supercharger is directly integrated with the engine, such as sharing a common lubrication system, as foreign debris occasioned by supercharger failure can leak into the internal components of the engine. It has recently been determined that these problems are exacerbated by the large degree of "slop" associated with the flywheel, thus limiting the prior art superchargers to direct drive systems that take power directly off of the crankshaft. Some of these problems, as well as others, associated with supercharging a V-twin motorcycle engine are discussed in U.S. Pat. No. 6,105,558 entitled SUPERCHARGING APPARATUS, issued Aug. 22, 2000.

All prior art supercharged motorcycles, including the supercharging system disclosed in the '558 patent, are problematic and subject to several undesirable limitations. For example, all prior art superchargers are driven directly off of the crankshaft and accordingly require drive components, and in most cases, the supercharger housing itself, to be positioned on, above, and/or outboard of the crankshaft. Such positioning is undesirable as these components project into the leg-receiving area of the motorcycle where the rider's legs would otherwise be located during normal operation thereby interfering with the rider's comfort and operation of the motorcycle. Additionally, such positioning undesirably alters the otherwise smooth aesthetic look of the already crowded engine and crankshaft area. Accordingly, there is a need for an improved supercharger system for a motorcycle that does not interfere with the rider's normal operating position or materially alter the overall appearance and sound of the motorcycle and does not cause engine damage in the event of a catastrophic failure of the system.

SUMMARY OF THE INVENTION

The present invention provides an improved supercharged motorcycle that does not suffer from the problems and limitations of the prior art supercharged motorcycles detailed above. The inventive supercharged motorcycle includes an improved drive assembly that compactly spans the drive train components of the motorcycle while remaining entirely inboard of, and thus does not interfere with, the rider's anatomical engagement with the motorcycle. The unique drive assembly enables the supercharger to be positioned in the otherwise unused space in the fore area of the motorcycle chassis and driven off of a selected component of the generally aftward drive train of the motorcycle. Preferred embodiments of the drive assembly include a breakaway power take-off drivingly communicating the supercharger's impeller and the motorcycle's drive train so that failure of one does not impact the other.

A first aspect of the present invention concerns a supercharged motorcycle broadly including a front wheel, a rear wheel longitudinally spaced from the front wheel, an engine including a rotatable crankshaft generally positioned between the wheels, and an air induction system operable to deliver compressed induction fluid to the engine. The air induction system includes a supercharger and a drive assembly drivingly connecting the supercharger and the crankshaft. The supercharger is longitudinally spaced forward of the crankshaft to define a fore area therebetween. The drive assembly spans the fore area.

A second aspect of the present invention concerns a supercharged motorcycle for mounted operation by a rider. The motorcycle broadly includes a chassis operable to be mounted by the rider in a normal operating position, an engine, and an air induction system operable to deliver compressed induction fluid to the engine. The chassis includes a front wheel, a rear wheel longitudinally spaced from the front wheel, a frame supported between the wheels, a gas tank spaced between the wheels, a seat positioned aft of the gas tank and configured to support the rider in the normal operating position, and a pair of footboards spaced on either side of the frame and positioned generally below the gas tank and the seat. The engine includes a rotatable crankshaft generally positioned between the wheels. The air induction system includes a supercharger and a drive assembly drivingly connected to the supercharger and the engine to supply power from the engine to the supercharger. The chassis and engine cooperate to define a pair of leg-receiving areas spaced on either side of the chassis and each being operable to receive a corresponding leg of the rider when the rider is mounted on the seat in the normal operating position. Each of the leg-receiving areas is generally defined by a curvilinear leg path extending between the seat and a respective one of the footboards that mimics the corresponding rider's leg when the rider is mounted on the seat in the normal operating position. The entire air induction system is positioned outside of the leg-receiving areas with at least a portion of the air induction system extending between the leg paths.

A third aspect of the present invention concerns a method of supercharging a motorcycle broadly including the steps of determining a generally normal operating position for a rider operating the motorcycle while mounted thereon wherein the rider's legs are received in a pair of leg-receiving areas spaced on either side of the chassis of the motorcycle, providing an air induction system to deliver compressed induction fluid to the engine of the motorcycle, and positioning the air induction system on the chassis so that the entire air induction system is outside of the leg-receiving areas.

A fourth aspect of the present invention concerns a supercharged motorcycle broadly including a chassis operable to be mounted by a rider and including a front wheel and a rear wheel longitudinally spaced from the front wheel, an engine including a rotatable crankshaft generally positioned between the wheels, a drive train drivingly interconnecting the crankshaft and the rear wheel and including a rotatable driven element longitudinally spaced from the crankshaft and an endless element drivingly interconnecting the crankshaft and the driven element, and an air induction system operable to deliver compressed induction fluid to the engine. The air induction system includes a supercharger and a drive assembly. The drive assembly drivingly interconnects the drive train and the supercharger and includes an indirect power take-off component drivingly engaging one of the driven and endless elements.

A fifth aspect of the present invention concerns a supercharged vehicle broadly including a chassis, an engine, and an air induction system operable to deliver compressed induction fluid to the engine and including a supercharger and a supercharger drive. The supercharger drive drivingly interconnects the engine and the supercharger. The drive includes first and second rotatable drive members that cooperate to transfer driving power from the engine to the supercharger. The drive further includes a breakaway coupler assembly selectively interconnecting the drive members so that the members are normally drivingly connected by the coupler assembly under a variable torsion force. The coupler assembly is configured to drivingly disconnect the members and enable the members to rotate independently of one another for at least one revolution when the torsion force exceeds a predetermined value.

A sixth aspect of the present invention concerns a method of supercharging a motorcycle broadly including the steps of rotatably driving the motorcycle's crankshaft off of the motorcycle's engine, simultaneously rotatably driving an impeller off of the motorcycle's crankshaft to compress induction fluid for the motorcycle's engine when the crankshaft is rotated, and preventing one of the impeller and crankshaft from rotating while the other one continues to rotate.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 5 is a partial perspective view of the supercharged motorcycle illustrated in FIGS. 1-4 showing the positioning of the air induction system entirely outside of the motorcycle's left side leg-receiving area;

FIG. 6 is a partial top perspective view of the supercharged motorcycle illustrated in FIGS. 1-5 showing the portion of the drive assembly of the air induction system that spans the leg-receiving areas being positioned entirely inboard of the leg-receiving areas;

FIG. 7 is a partial front perspective view of the supercharged motorcycle illustrated in FIGS. 1-6 shown with a rider mounted on the seat in the normal operating position illustrating that the entire air induction system is spaced from the rider's legs in the normal operating position so as not to engage or interfere therewith;

FIG. 8 is a is a partial rear perspective view of the supercharged motorcycle illustrated in FIGS. 1-7 shown with the rider mounted on the seat in the normal operating position illustrating the drive assembly spanning between the rider's legs and being positioned entirely inboard thereof;

Figure 11:
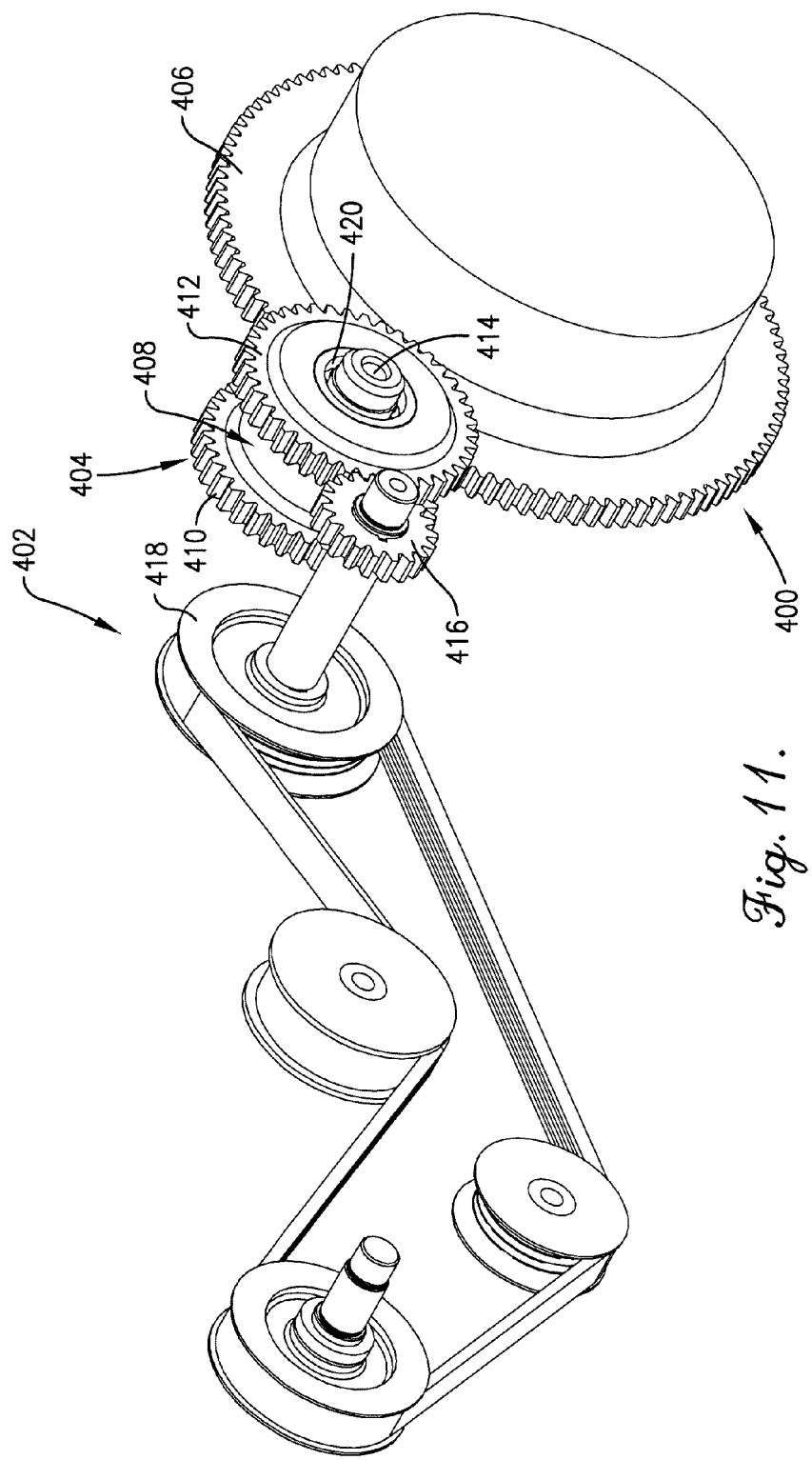
Figure 12:
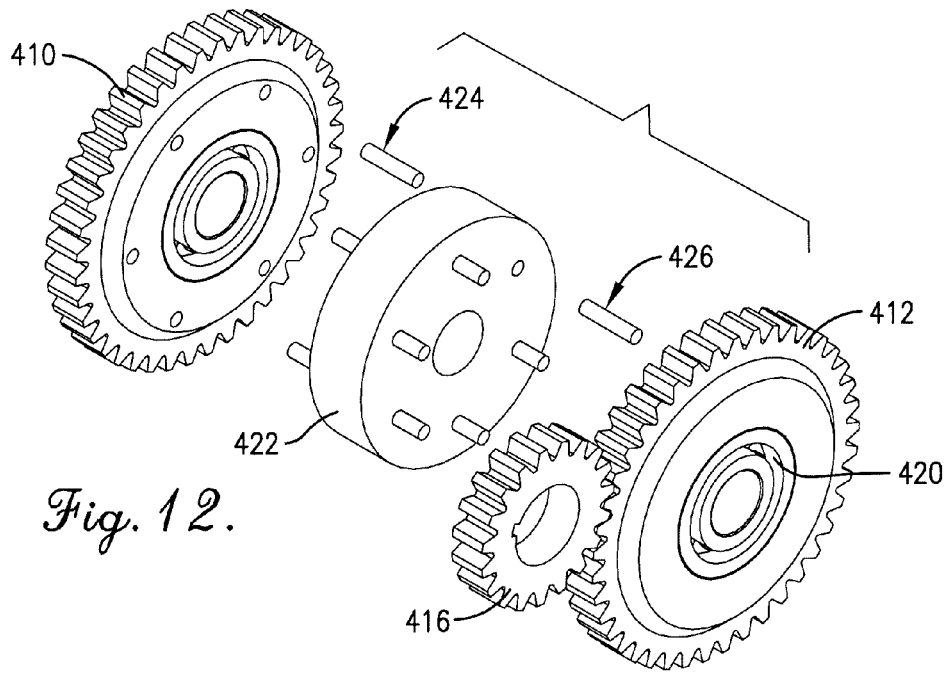
Figure 13:
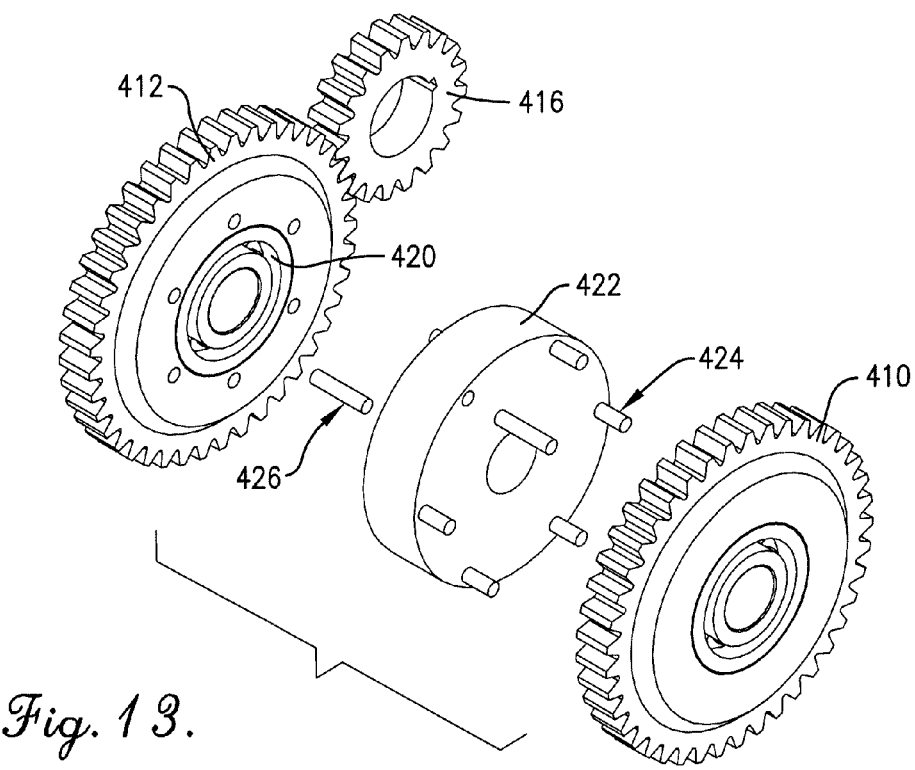

FIG. 11 is a partial perspective view of a supercharged motorcycle constructed in accordance with the principles of a third preferred alternative embodiment of the present invention and illustrating a first drive gear of the power take-off of the air induction system's drive assembly drivingly engaging the flywheel of the motorcycle's drive train and being coupled to a second drive gear with a breakaway coupler;

FIG. 12 is an enlarged exploded assembly view of the air induction system's power take-off of the supercharged motorcycle illustrated in FIG. 11 showing the assembly of the breakaway coupler with the first and second drive gears; and FIG. 13 is similar to FIG. 12 and is an enlarged exploded assembly view of the power take-off illustrated in FIGS. 11 and 12 showing the assembly of the break away coupler with the first and second drive gears.

DETAILED DESCRIPTION OF THE PREFERRED EMBODIMENTS

Figure 1:
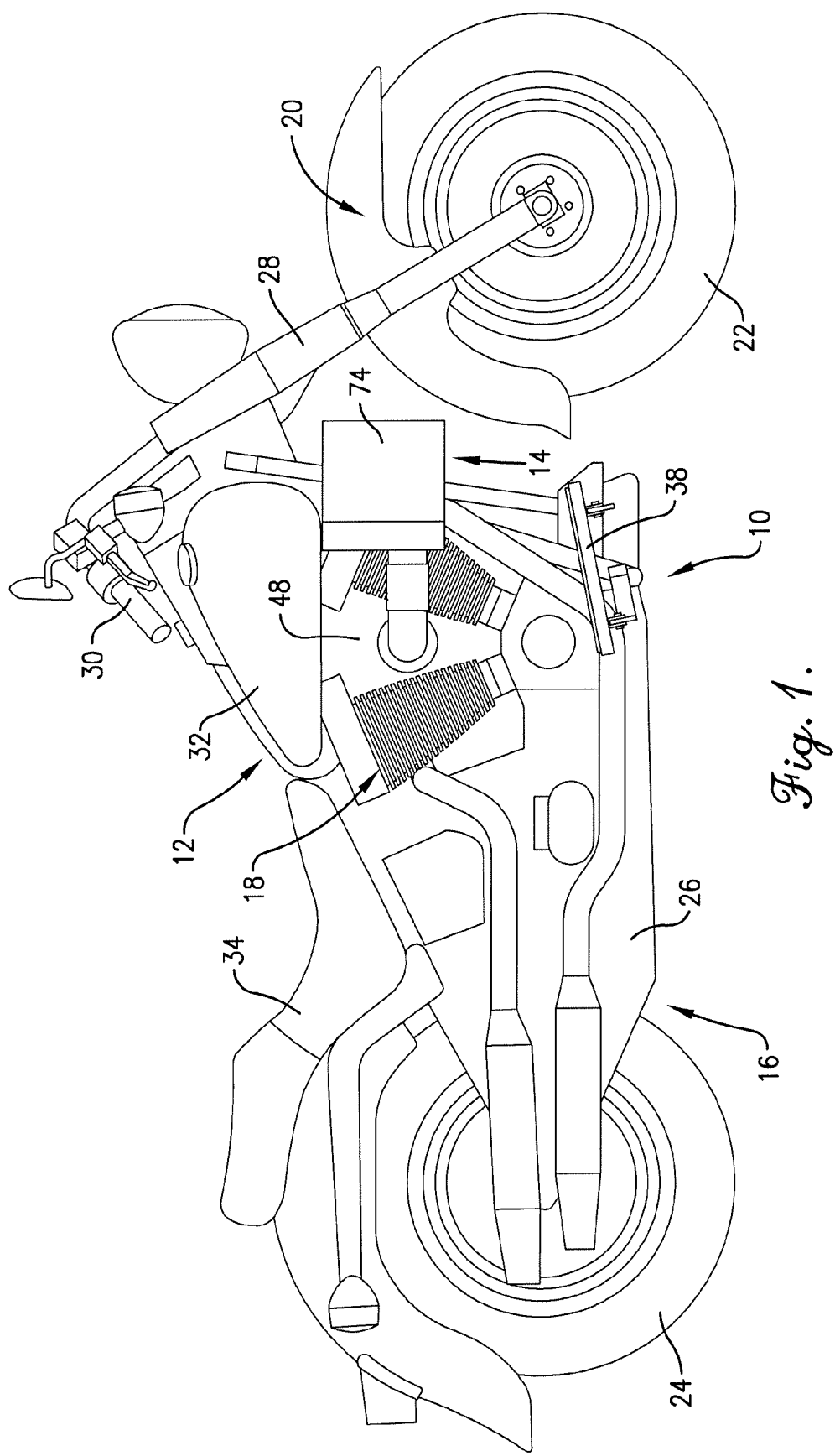
FIG. 1 is a right side elevational view of a supercharged motorcycle constructed in accordance with the principles of a preferred embodiment of the present invention.

FIG. 1 illustrates a supercharged motorcycle 10 constructed in accordance with the principles of a preferred embodiment of the present invention and configured for mounted operation by a rider R (see FIGS. 7-8). As further detailed below, the principles of the present invention are particularly well suited for V-twin engines, such as the Harley-Davidson® V-twin engine illustrated in FIGS. 1-8. However, the principles of the present invention are not limited to any particular type of motorcycle engine and equally apply to virtually any type of engine on virtually any brand of motorcycle. Furthermore, many of the aspects of the present invention also apply to other all-terrain type vehicles, such as three-wheeled and four-wheeled vehicles wherein the rider straddles the chassis of the vehicle in a mounted operating position. The illustrated supercharged motorcycle 10 broadly includes a motorcycle 12 and an air induction system 14 configured to deliver compressed induction fluid to the motorcycle's engine (see FIGS. 1 and 2).

Turning initially to FIGS. 1-2 and 5-8, the illustrated motorcycle 12 broadly includes a chassis 16 operable to be mounted by the rider R, an engine 18 supported on the chassis 16 for powering the chassis 16 in a forward direction, and a body 20 supported on the chassis 16. The motorcycle 12 is a conventional motorcycle, such as one typically available from an OEM, and in this regard will only be briefly described with the understanding that the motorcycle 12 could include virtually any conventional components in virtually any manner known in the art. The chassis 16 includes aligned longitudinally spaced front and rear wheels 22 and 24, respectively, and a frame 26 supported between the wheels 22,24. The frame 26 is supported on the front wheel 22 by a fork 28 that can be manipulated to steer the motorcycle 12 by handlebars 30. The chassis 16 further includes a gas tank 32 spaced between the wheels 22,24 and supported on the frame 26 and a seat 34 positioned aft of the gas tank 32 and configured to support the rider R on the motorcycle 12. The illustrated chassis 16 also includes a pair of footboards 36 and 38 spaced on either side of the frame 26 and positioned generally below the gas tank 32 and the seat 34 for supporting the feet F of the rider R when mounted on the motorcycle 12 (see FIGS. 7 and 8). The footboards 36,38 are virtually identically configured and therefore only the footboard 36 will be described in detail with the understanding that the footboard 38 is similarly constructed. The footboard 36 presents a top foot-supporting surface 36a for supporting the foot F of the rider R. The surface 36a defines an outermost edge 36b laterally spaced from the frame 26 and an innermost edge 36c adjacent the frame 26. In one manner known in the art, the motorcycle 12 includes foot controls 40, such as for shifting gears and the like, that are positioned adjacent the footboard 36 (see FIGS. 5-8). Although the foot-supporting surface 36a is configured to receive the entire foot F of the rider R, in one manner known in the art, the footboards 36,38 could also be simple pegs that present a relatively smaller foot-supporting surface.

The chassis 16 could be variously configured in any manner known in the art, however, it is important that the chassis 16 be configured to support the rider R in a normal operating position. A normal operating position is shown in FIGS. 7 and 8 wherein the rider R is sitting on the seat 34 so the rider's hands can reach the handlebars 30 and the rider's feet F are supported on the footrests 36,38 where they can readily and selectively activate the foot controls 40. In this regard, as shown in FIGS. 5 and 6, the motorcycle 12 naturally defines a pair of leg-receiving areas ALR spaced on either side of the chassis 16 and each receiving a corresponding leg L of the rider R when the rider R is mounted on the seat 34 in the normal operating position. In the illustrated motorcycle 12, the chassis 16 and the engine 18 cooperate to define the leg-receiving areas ALR. In this regard the leg-receiving areas ALR generally extend from the footrests 36,38 to the seat 34 and have a forward boundary determined along the tapered portion of the gas tank 32 and an aftward boundary determined along the tapered portion of the seat 34 (see FIG. 6). Each of the leg-receiving areas ALR is generally defined by a curvilinear, somewhat U-shaped leg path PL (see FIGS. 1-2 and 7-8) extending between the seat 34 and a respective one of the footrests 36,38 that mimics the corresponding rider's leg L when the rider R is mounted on the seat 34 in the normal operating position. In the illustrated motorcycle 12, the gas tank 32 defines a pair of laterally outermost rider-engaging contact points CP oppositely spaced on either side of the chassis 16 that engage the rider's legs L, and in this case, the knee of the rider's legs L when the rider R is mounted on the seat 34 in the normal operating position (see FIG. 7). However, for differently configured motorcycles, the contact points CP could be defined on components of the chassis 16 other than the gas tank 34, such as the frame 26, or on the body 20 for example. Each of the contact points CP is positioned along a respective one of the leg paths PL. Each of the contact points CP lies in a common plane with a respective one of the innermost edges, such as innermost edge 36c. Each of the leg paths PL also lies in a respective one of the common planes. In the illustrated motorcycle 12, the common planes angle in slightly from the innermost edges 36c to the contact points CP and define the inboard boundaries of the leg-receiving areas ALR.

It will be appreciated that the leg-receiving areas ALR may vary slightly from motorcycle to motorcycle depending on the make and model of the motorcycle. However, every motorcycle will define leg-receiving areas ALR. These areas ALR will in large part be determined by the leg paths PL defined by the rider's legs L when seated on the motorcycle in the normal operating position and the anatomical positioning of the rider therein. That is to say, when seated on the motorcycle in the normal operating position, a rider's feet will be spread apart a certain distance, typically ranging between about eighteen and forty-two inches and the rider's knees will be spread apart a lesser distance, typically ranging between about twelve and thirty-six inches. Accordingly, the rider's lower leg region between the knee and the foot will be angled inward slightly from the foot to the knee, typically ranging between about five and thirty-five degrees. This anatomical angle mimics the angle of the common planes detailed above relative to the horizontal center plane of the motorcycle.

Figure 2:
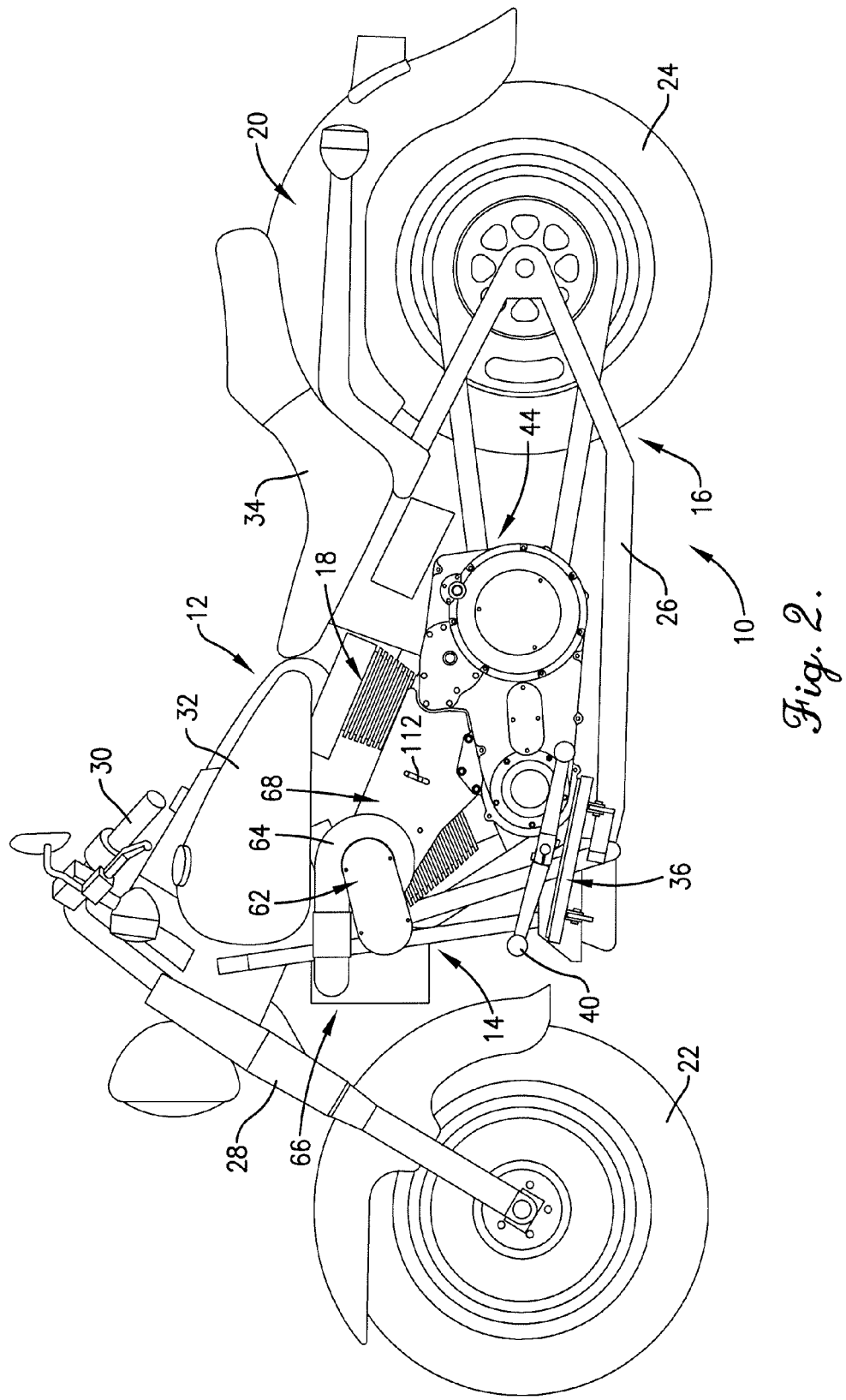
FIG. 2 is a left side elevational view of the supercharged motorcycle illustrated in FIG. 1.
Figure 4:
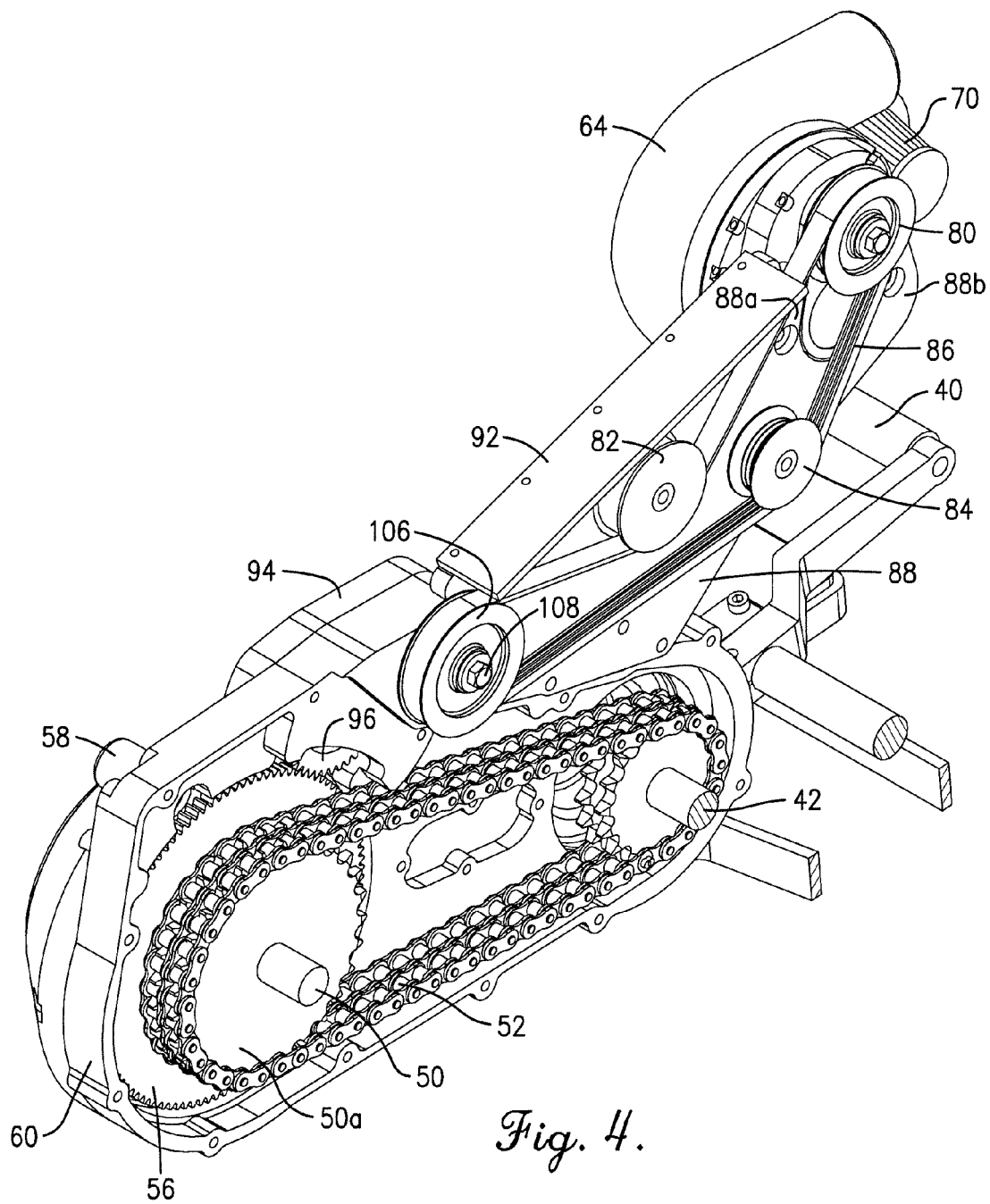
FIG. 4 is an enlarged back perspective view the air induction system as illustrated in FIG. 3 illustrating the components of the drive assembly and their interconnection with the motorcycle's flywheel.

The engine 18 is rigidly mounted in the frame 26 and in one manner well known in the art, includes a crankshaft 42 drivingly connected to the rear wheel 24 by a drive train 44 (see FIGS. 2 and 4). The engine 18 is fuel injected and includes an electronic fuel injection apparatus 46 in communication with an intake manifold 48. However, the engine 18 could be carbureted and need not be fuel injected. The drive train 44 includes a motorcycle power take-off shaft 50 that is fixed to a pair of driven sprockets 50a that are driven by the crankshaft 42 (see FIG. 4). In one manner known in the art, the illustrated driven sprockets 50a are driven by the crankshaft 42 by a pair of endless chains 52. The power take-off shaft 50 in turn drives the rear wheel 24 by a drive chain or belt (not shown). As is known in the art, the power take-off shaft 50 drives the drive chain through a geared transmission 54 (e.g., four speed, five speed, etc.) controlled by a clutch (not shown) that is operated by the foot controls 40. The illustrated drive train 44 further includes a toothed flywheel 56 that is fixed to the power take-off shaft 50 and to a starter motor 58 (see FIG. 4). The engine 18 and the drive train 44 could be variously configured in any manner known in the art and could include for example a belt driven power take-off shaft.

The body 20 is supported on the chassis 16. The illustrated body 20 includes a pair of fenders covering the front and rear wheels 22,24. However, the body 20 could be variously configured and include for example more substantial body fairing. In this regard, the body 20 could define the laterally outermost contact points CP along the leg paths PL.

The illustrated motorcycle 12 is a Harley-Davidson® 2001 Softail Fatboy with a rigid mount 1450 cc V-twin Twin Cam 88B balanced engine with electronic fuel injection. The principles of the present invention are particularly well suited for supercharging Harley-Davidson® V-twin engines and as further detailed below, solves many of the prior art problems that have frustrated, if not virtually made impossible, successful supercharger applications for these engines. However, the principles of the present invention are equally applicable to virtually any motorcycle engine and in this regard the motorcycle 12 could be any conventional motorcycle as is available from numerous OEMs.

It will be appreciated that the conventional motorcycle 12 has been modified with the air induction system 14 to arrive at the supercharged motorcycle 10. In this regard, the crankcase's side cover 60 has been modified to house some of the components of the air induction system 14 as will be subsequently be described. One or both of the modified crankcase side cover 60 and the air induction system 14 could be originally manufactured on the motorcycle 12, for example by the OEM, or these components could be retrofit after market, such as by the end user.

Turning to FIGS. 3-8, the illustrated air induction system 14 is configured to deliver compressed induction fluid to the intake manifold 48 of the engine 18 and broadly includes an air intake assembly 62 for receiving ambient air and delivering it downstream, a supercharger 64 in downstream communication with the air intake assembly 62 for compressing the air, an air delivery assembly 66 for delivering the compressed air to the engine 18, and a drive assembly 68 for powering the supercharger 64 off of the drive train 44. In more detail, the air intake assembly 62 receives ambient air through a filter 70 and delivers the filtered air downstream to the supercharger 64. It will be appreciated that the illustrated air intake assembly 62 is positioned forward of the supercharger 64 and towards the front of the motorcycle 12 to facilitate receipt of a fresh supply of ambient air. However, the air intake assembly 62 could be alternatively positioned. Although some type of filter is preferred, the air intake assembly is not necessary and the supercharger 64 could receive air directly from the atmosphere.

The supercharger 64 intakes the filtered air from the air intake assembly 62, compresses the air, and delivers the compressed air to the air delivery assembly 66. In more detail, the illustrated supercharger 64 is a centrifugal supercharger including a rotatable impeller housed in a volute case that compresses the air when rotated. In one manner known in the art, the impeller is rotated at significantly higher rpm than the crankshaft 42. In this regard, as further detailed below, the drive assembly 68 is preferably a step-up drive mechanism. However, the supercharger 64 preferably additionally includes a step-up transmission that facilitates the desired high rotational speeds of the impeller. Given the high operational speeds of the impeller and the attendant loads on the internal components of the supercharger 64 coupled with the undesirable impact of catastrophic failure of the supercharger 64, the supercharger 64 preferably includes an impeller shaft supported by a velocity variance-reducing multiple bearing arrangement and a dedicated lubrication system for lubricating the internal components of the supercharger 64. Suitable preferred multiple bearing arrangements are disclosed in applicant's U.S. Pat. No. 6,478,469, issued Nov. 12, 2002, entitled VELOCITY VARIANCE REDUCING MULTIPLE BEARING ARRANGEMENT FOR IMPELLER SHAFT OF CENTRIFUGAL SUPERCHARGER, as well as copending applications for U.S. patent Ser. Nos. 09/683,871 and 10/064,835, filed Feb. 26, 2002 and Aug. 22, 2002, respectively, both bearing the same title as the '469 patent, all of which are hereby incorporated by reference herein. Suitable preferred self-contained dedicated lubrication systems are disclosed in the Jones '619 application previously incorporated by reference herein. It is believed a supercharger having a multiple bearing arrangement and/or a self-contained, dedicated lubrication system reduces the risks of premature failure or in the event of such failure, reduces any attendant undesirable engine damage.

In order to maintain the overall original sound of the motorcycle 12, the supercharger 64 further preferably includes noise-reducing components and/or features such as a noise-reducing impeller shaft. A suitable noise dampening shaft construction is disclosed in applicant's U.S. Pat. Nos. 6,478,016 and 6,516,788, issued Nov. 12, 2002 and Feb. 11, 2003, respectively, both entitled GEAR DRIVEN SUPERCHARGER HAVING NOISE REDUCING IMPELLER SHAFT, both of which are hereby incorporated by reference herein. It is believed the supercharger designs disclosed in the above incorporated patents and applications combine to provide a supercharger capable of withstanding the operational loads somewhat unique to motorcycle applications, yet enables the supercharger to operate at relatively low noise levels so as not to undesirably hinder the original sound of the motorcycle. In particular, these supercharger designs provide superior long-lasting, durable superchargers that are unlikely to catastrophically fail and are therefore well suited for motorcycle applications. However, it is within the ambit of the present invention to utilize various additional features and/or components for the centrifugal supercharger 64. For example, the supercharger 64 could include a soft material insert within the case such as the one disclosed in applicant's copending application for U.S. patent Ser. No. 10/349,411, filed Jan. 22, 2003, entitled METHOD AND APPARATUS FOR INCREASING THE ADIABATIC EFFICIENCY OF A CENTRIFUGAL SUPERCHARGER (see U.S. Patent Publication No. 20040109760), which claims the priority of provisional U.S. Application Ser. No. 60/430,814, filed Dec. 4, 2002 and bearing the same title, both of which are hereby incorporated by reference herein.

Although the above-described centrifugal supercharger is preferred, it is within the ambit of the present invention to utilize virtually any type of compressor for pressurizing induction fluid for the engine 18. For example, the air induction system 14 could utilize a Roots-type blower or even a turbocharger. However, for some aspects of the present invention, it is important that the compressor be driven off of the drive train and not for example, a turbocharger that is driven off of the engine's exhaust.

Turning to FIGS. 1-2 and 7, the air delivery assembly 66 is in fluid communication with the supercharger 64 and the intake manifold 48 of the engine 18 and delivers the compressed air from the supercharger 64 to the engine 18. In more detail, the illustrated air delivery system 66 includes an air supply tube 72 and an intercooler 74 disposed along the tube 72. In one manner known in the art, the intercooler 74 cools the compressed induction fluid prior to discharging the air into the manifold 48. In this regard, the intercooler 74 is positioned on the right side of the motorcycle 12 adjacent the inlet of the tube 72 into the manifold 48. The intercooler 74 is an air cooled intercooler and thus is positioned adjacent the front of the motorcycle 12 so as to communicate with the fresh air drawn around the motorcycle 12 as the motorcycle 12 is propelled in the forward direction. The air delivery assembly 66 could be alternatively configured. For example, the quantity of compressed air delivered to the intake manifold 48 could be controlled by an inlet valve that varies the supply of air to the supercharger in response to downstream air pressure conditions or at the rider's discretion. Such an inlet valve is disclosed in applicant's copending application for U.S. patent Ser. No. 10/249,579, filed Apr. 21, 2003, entitled AIR INDUCTION SYSTEM HAVING INLET VALVE, which is hereby incorporated by reference herein. The air delivery assembly 66 need not include an intercooler and could for example be configured so that the supercharger 64 discharges compressed air directly into the intake manifold 48 without the need for extended tubing.

Figure 3:
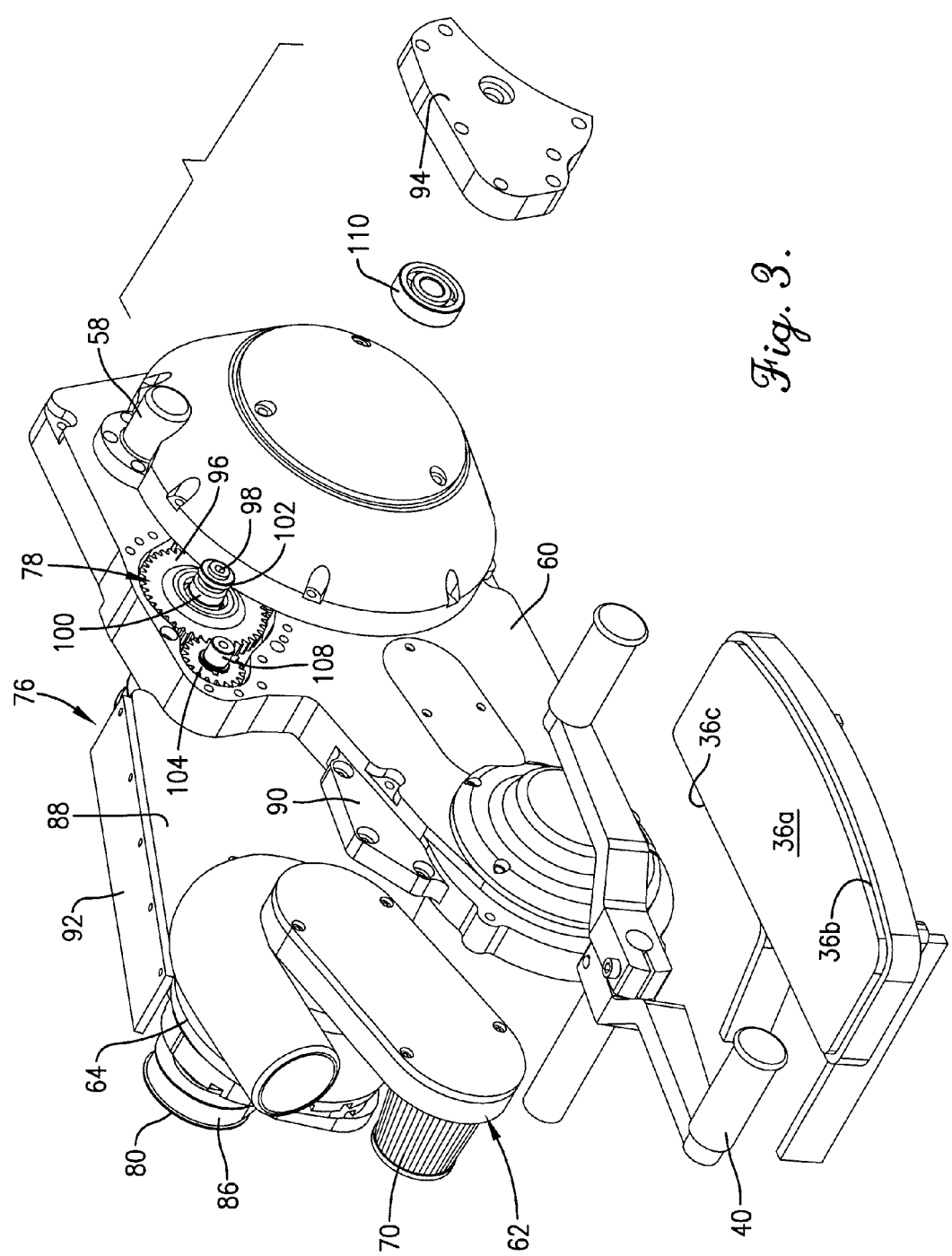
FIG. 3 is an enlarged partially exploded front perspective view of the major components of the air induction system of the supercharged motorcycle illustrated in FIGS. 1 and 2 shown supported on the motorcycle's modified crankcase cover (shown with a portion removed) and illustrated with the motorcycle's foot controls and left footboard.

Returning to FIGS. 3-8, the illustrated drive assembly 68 powers the supercharger 64 off of the drive train 44. The drive assembly 68 broadly includes a support housing 76, an indirect power take-off subassembly 78, a driven sheave 80, a pair of idler sheaves 82 and 84, and an endless drive element 86 drivingly communicating the power take-off subassembly 78 and the driven sheave 80. As shown in FIGS. 3 and 4, the illustrated support housing 76 cooperates with the modified side cover 60 to support the other components of the air induction system 14 on the side cover 60. In more detail, the illustrated housing 76 includes a generally flat elongated support bracket 88 that supports the supercharger 64 on the side cover 60. The bracket 88 is fixed to a gusset 90 on the modified side cover 60, such as by bolts or screws or the like. The end of the bracket 88 proximate the supercharger 64 includes a pair of spaced apart fingers 88a and 88b that receive a portion of the supercharger 64 therebetween (see FIG. 4). The supercharger 64 is also fixed to the proximate end of the bracket 88 by bolts or screws or the like. The distal end of the bracket 88 is arcuately configured so as to complement the profile of the side cover 60 and the gusset 90 is offset from the backside of the side cover 60. In this manner, the bracket 88 overlaps and engages the top surface of the side cover 60 and is therefore supported thereby. The illustrated support housing 76 further includes a top plate 92 fixed along the top surface of the bracket 88. The top plate 92 functions as a guard to prevent undesired items, such as the clothing of the rider R, from being drawn into, or interfering with, the moving components of the drive assembly 68. For purposes that will subsequently be described, the illustrated housing 76 further includes a support plate 94 fixed to the outside of the side cover 60 with bolts or screws or the like (see FIG. 3). In the illustrated air induction system 14, other than the engagement between the air supply tube 72 and the intake manifold 48, the air induction system 14 is supported on the motorcycle 12 by the support bracket 88 and the support plate 94 in cooperation with the modified side cover 60. It is within the ambit of the present invention to utilize various alternatively configured support housings for the air induction system 14, including configurations that use multiple brackets. However, as will be further detailed below, it is important for some aspects of the invention that the support housing remains clear of the leg-receiving areas ALR defined by the motorcycle 12.

The illustrated drive assembly 68 is an indirect drive—that is, the supercharger 64 is not driven directly off of the crankshaft 42—as well as a step-up drive—that is, a drive that cooperates with the supercharger's transmission to rotate the impeller of the supercharger 64 at an increased rpm relative to the rpm of the crankshaft 42. In this regard, the illustrated indirect power take-off subassembly 78 includes an undersized power take-off gear 96 that drivingly intermeshes with the flywheel 56 (see FIGS. 3 and 4). The gear 96 is fixed to a shaft 98 that is in turn rotatably supported between the side cover 60 and the support plate 94. The shaft 98 is supported by a pair of bearing assemblies (with only the bearing assembly 100 shown in FIG. 3) press fit within respective sockets (not shown) in the side cover 60 and support plate 94. In the usual manner, a wavy spring washer 102 is provided in at least one of the sockets. The bearing assemblies, including the illustrated assembly 100, are preloaded grease-packed bearings, however, any suitable bearing arrangement could be utilized. In the illustrated power take-off subassembly 78, the power take-off gear 96 drivingly intermeshes with a driven gear 104 (see FIG. 3) that is drivingly coupled to a power take-off sheave 106, however, the sheave 106 could be coupled directly to the power take-off gear 96 without the need for the intermediate driven gear 104, depending on the desired rotational direction of the impeller of the supercharger 64. The gear 104, similar to the gear 96, is fixed to a shaft 108 that is rotatably supported between the side cover 60 and the support plate 94 by bearing assemblies (with only the bearing assembly 110 being shown in FIG. 3). However, unlike the shaft 98, the shaft 108 is cantilevered to extend out of the inside of the side cover 60 where it is fixed to the power take-off sheave 106 (see FIG. 4). In this manner, when the flywheel 56 is rotated, the power take-off sheave 106 is also caused to rotate in the same rotational direction but at a higher rpm. It is within the ambit of the present invention to utilize various alternative configurations for the power take-off subassembly 78, for example, the power take-off gear could intermesh with drive components of the motorcycle other than the flywheel 56. However, it is important for some aspects of the invention that the power take-off gear be driven by one or more components of the drive train 44 (e.g., the power take-off shaft 50, the driven sprockets 50a, the chains 52, the transmission 54, the flywheel 56, etc.).

As previously indicated, the power take-off subassembly 78 drives the driven sheave 80 via the endless drive element 86. In more detail, and as shown in FIG. 4, the illustrated endless drive element 86 is a belt that encircles the sheaves 106 and 80 and entwines through the pair of idler sheaves 82 and 84. The idler sheaves 82,84 are each rotatably supported on the support bracket 88 in any suitable manner. In one manner known in the art, the idler sheave 82 is adjustable relative to the bracket 88 (e.g., via a slot 112 formed in the bracket 88 as shown in FIG. 2) to thereby adjust the tension in the belt 86. The driven sheave 80 is fixed to one end of a cantilevered shaft extending out of the housing of the supercharger 64 (e.g., the impeller shaft, a transmission shaft, etc.) so that the shaft is driven by the sheave 80. In this manner, when the flywheel 56 is rotated by the motorcycle engine 18, the drive assembly 68 powers the supercharger 64 off of the engine 18 at a stepped up rpm relative to the crankshaft 42. The belt drive system is preferred in that the belt 86 and sheaves 80,106 provide some degree of give (e.g., the belt 86 will slip relative to the sheaves 80,106, etc.) in the event of failure of the air induction system that facilitates reducing the risk of undesirable engine damage. However, the drive assembly 68 could be alternatively configured and utilize different endless elements entraining various driven components rather than the illustrated belt drive system that uses sheaves. The drive assembly 68 could also be configured to power the supercharger 64 without utilizing an endless drive element, such as with a gear train, or the like.

Turning now to FIGS. 5-8, the air induction system 14, including the supercharger 64 and the air intake, air delivery, and drive assemblies 62,66,68, is positioned entirely outside of the leg-receiving areas ALR so as to not engage the rider R, including the rider's legs L and feet F, when the rider R is mounted on the seat 34 in the normal operating position. In more detail, in the illustrated air induction system 14, the supercharger 64 is forwardly spaced from the crankshaft 42 in the forward area of the motorcycle 12 defined between the crankshaft 42 and the front wheel 22. The supercharger 64 is sufficiently spaced from the crankshaft 42 to define a fore area therebetween. The power take-off subassembly 78 is spaced aftwardly from the crankshaft 42 adjacent the flywheel 56 in the back area of the motorcycle 12 defined between the crankshaft 42 and the rear wheel 24. The flywheel 56 is spaced from the crankshaft 42 to define an aft area therebetween. The drive assembly 68 spans between the back and forward areas of the motorcycle 12 and spans the entire aft and fore areas defined around the crankshaft 42. In this manner, at least a portion of the drive assembly 68 (e.g., portions of the housing 76, the belt 86 and the sheaves 82,84) extends between the leg paths PL. It is important to many aspects of the present invention that the portion of the air induction system 14 extending between the leg paths PL—in the illustrated system 14 it is the portion of the drive assembly 68 just described—is positioned entirely inboard of the leg paths PL so as to not interfere with the rider's legs L when the rider R is seated on the seat 34 in the normal operating position. It will be appreciated that in the illustrated air induction system 14, the entire drive assembly 68, including those portions not extending between the leg paths PL, is positioned entirely inboard of the common planes that define the inboard boundaries of the leg-receiving areas ALR. The low profile configuration of the drive assembly 68 enables the relatively larger components of the air induction system 14 to be placed outside of the forward and aftward boundaries of the leg-receiving areas ALR, for example, the supercharger 64 is positioned ahead of the forward boundary of the ALR and the power take-off subassembly 78 is positioned behind the aftward boundary of the ALR.

It is believed that driving the air induction system 14 off of one or more components of the drive train 44—rather than, for example, off of the crankshaft 42—cooperates with the forward positioning of the supercharger 64 and the sleek configuration of the drive assembly 68 extending there between provides an air induction system 14 that is preferred by motorcycle riders, particularly Harley-Davidson® riders. That is to say, the illustrated air induction system 14 does not undesirably alter the overall appearance or sound of the motorcycle 12 and does not interfere with the preferred, safe operation thereof. However, the air induction system 14 could be variously alternatively configured. For example, the supercharger could be alternatively positioned and driven off of components of the drive train other than the flywheel, or for some aspects of the invention, could be driven directly off of the crankshaft (although not preferred), and could be positioned on the right side of the motorcycle.

In operation, the air induction system 14 must first be integrated onto the motorcycle 12. As indicated above, this could be done by the OEM at the time of manufacture. Otherwise, the crankcase's original side cover must first be removed, to expose the relevant components of the drive train 44. The modified crankcase side cover 60 is then fitted with the power take-off gear 96—that is, the shaft 98 and bearing assembly are seated into the corresponding socket. For assembly purposes, the gear 96 could be keyed to the shaft 98. In a similar manner, the driven gear 104 is fitted into the cover 60 and intermeshed with the gear 96. The modified side cover 60 is then bolted onto the motorcycle 12. Once the cover 60 is in place, the support plate 94 can be press fit with bearing assemblies 100,110 and the wavy spring washers, such as the washer 102. The plate 94 can then be bolted onto the side cover 60. Next, the remainder of the support housing 76 can be bolted onto the side cover 60—that is, the top plate 92 can be bolted to the support bracket 88 and in turn the bracket 88 can be bolted to the gusset 90. The supercharger 64 is then bolted onto the fingers 88a,88b of the bracket 88. Next, the belt is entrained around the sheaves 80,82,84,106 and the sheaves are fixed onto their respective shafts and/or fixed to the bracket 88. Finally, the filter 70 is bolted onto the supercharger 64 and the air supply tube 72 and intercooler 74 are fixed between the supercharger 64 and the intake manifold 48. The supercharged motorcycle 10 is now ready for use.

In use, the rider R mounts the motorcycle 10 so that the rider R is seated on the seat 34. The starter motor 58 can then be activated to rotate the flywheel 56 to start the engine 18 of the motorcycle 10. The rider R can then activate the foot controls 40 to shift the motorcycle 10 into a forward gear. The rider R can then operate the motorcycle 10 while seated in the normal operation position with both feet F on respective footboards 36,38 so that the legs L are received in the leg-receiving areas ALR. In the normal operating position, the rider's legs L do not engage any part of the air induction system 14. When the motorcycle 10 is in operation, the power take-off gear 96 is rotated by the flywheel 56, which in turn rotates the driven gear 104 causing the power take-off sheave 106 to simultaneously rotate at rpms higher than that of the crankshaft 42. The sheave 106 in turn moves the drive belt 86 causing the driven sheave 80 to rotate with the sheave 106, thereby causing the impeller of the supercharger 64 to rotate. The rotating impeller of the supercharger 64 draws in ambient air through the filter 70, compresses it, and delivers it through the air delivery assembly 66 to the intake manifold 48 of the engine 18. This compressed induction fluid provides increased "boost," or power, to the engine 18 throughout its range of rpm.

Figure 9:
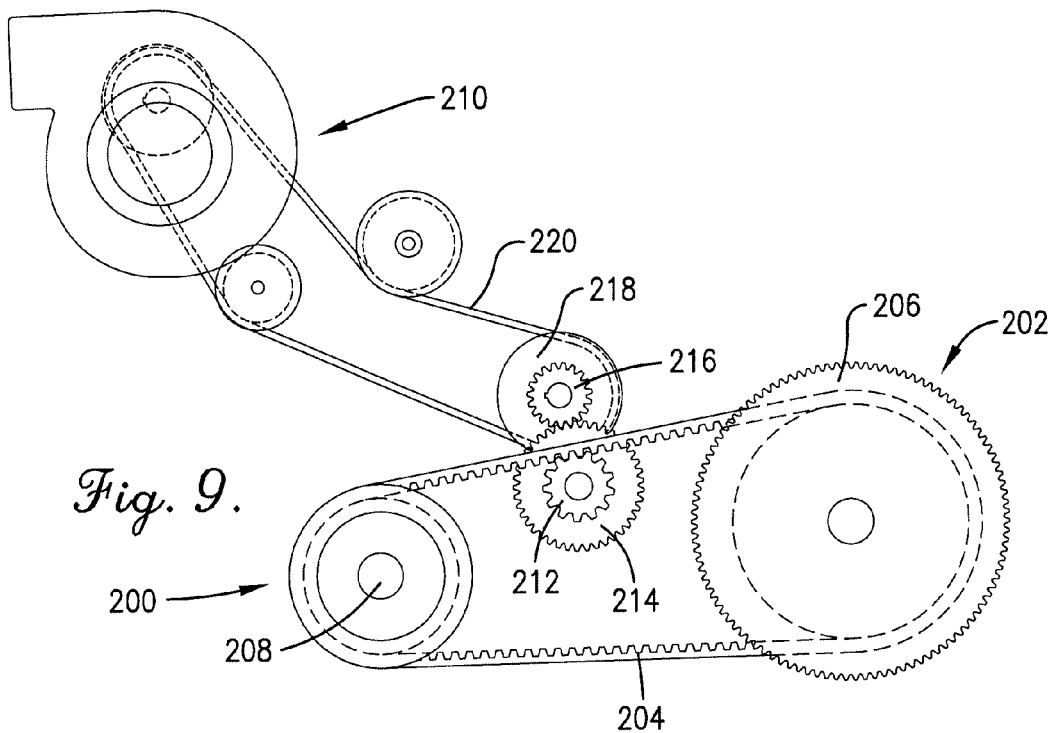
FIG. 9 is a partial side elevational view of a supercharged motorcycle constructed in accordance with the principles of a preferred alternative embodiment of the present invention and illustrating the power take-off of the air induction system's drive assembly drivingly engaging the belt of the motorcycle's drive train.

As previously indicated, the air induction system of the present invention can be variously configured and integrated into a motorcycle in a variety of ways. One such suitable alternative is the supercharged motorcycle 200 as partially shown in FIG. 9. The supercharged motorcycle 200 is similar in many respects to the supercharged motorcycle 10 described in detail above and therefore the supercharged motorcycle 200 will only be described with respect to its differences. In particular, the drive train 202 of the motorcycle 200 utilizes a belt 204 to drive the flywheel 206 off of the crankshaft 208. The air induction system 210 of the motorcycle 200 utilizes a power take-off gear 212 that is driven by the belt 204. In more detail, the power take-off gear 212 intermeshes with the belt 204 and is fixed relative to a transfer gear 214. The transfer gear 214 intermeshes with a driven gear 216. The driven gear 216 is fixed relative to a driven sheave 218 that is entrained by a drive belt 220 that powers the supercharger of the air induction system 210. The gears 212, 214,216 and the sheave 218 are rotatably supported on the side cover (not shown) and/or the support housing (not shown) of the system 210 in a manner similar to that detailed above with respect to the air induction system 14.

Figure 10:
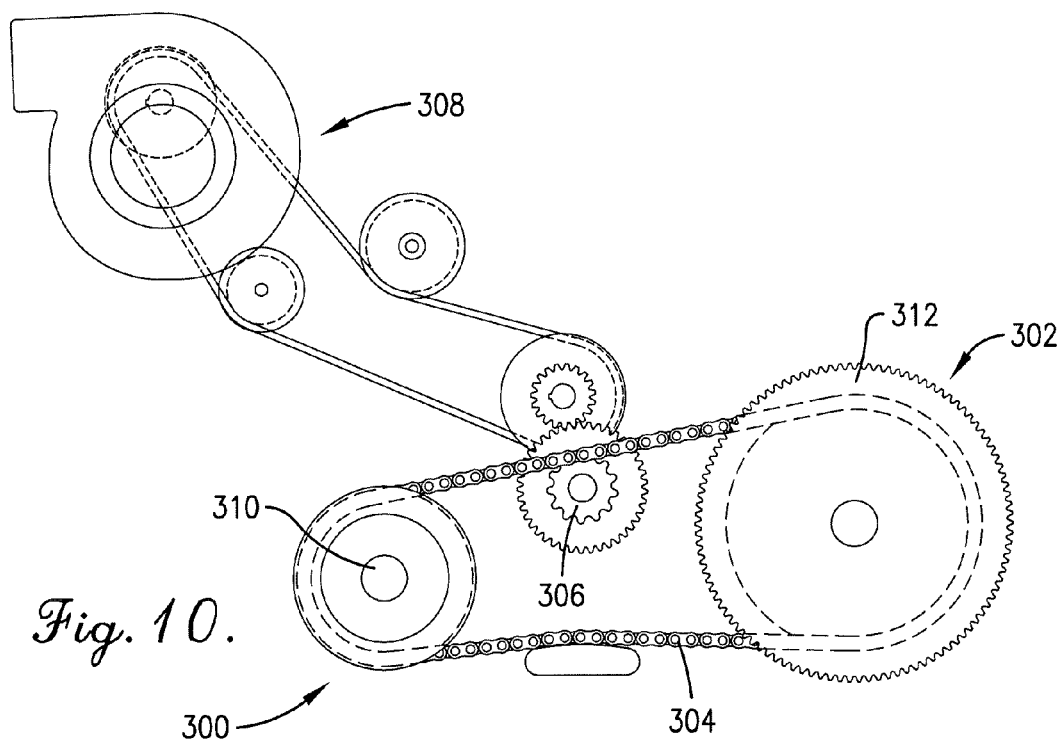
FIG. 10 is a partial side elevational view of a supercharged motorcycle constructed in accordance with the principles of a second preferred alternative embodiment of the present invention and illustrating the power take-off of the air induction system's drive assembly drivingly engaging the chain of the motorcycle's drive train.

A second preferred alternative embodiment of a power take-off subassembly driven off of the drive train of the motorcycle is shown in the supercharged motorcycle 300 partially illustrated in FIG. 10. The supercharged motorcycle 300 is virtually identical to the supercharged motorcycle 200 described above. However, the supercharged motorcycle 300 includes a drive train 302 that is driven by a chain 304 rather than a belt. A power take-off gear 306 for the air induction system 308 intermeshes with the chain 304 between the crankshaft 310 and the flywheel 312.

A third preferred alternative embodiment of the power take-off subassembly for an air induction system for a supercharged motorcycle is shown in the supercharged motorcycle 400 partially illustrated in FIGS. 11-13. The air induction system for the supercharged motorcycle 400 is driven off of the motorcycle's drive train by a drive assembly 402 (see FIG. 11). The drive assembly 402 includes an indirect power take-off subassembly 404 that is powered off of the drive trains's flywheel 406. The power take-off subassembly 404 is similar in many respects to the previously described power take-off subassembly 78, however, unlike the subassembly 78, the power take-off subassembly 404 includes a breakaway coupler assembly 408. The breakaway coupler aspects of the present invention are not limited to air induction system applications in motorcycles, but equally apply to air induction systems for virtually any vehicle, including automobiles, marine vehicles, and the like. The inventive breakaway coupler assembly 408 enables the motorcycle's drive train to continue operation in the event of catastrophic failure of the air induction system. In more detail, the breakaway coupler assembly 408 normally drivingly couples a power take-off gear 410 and a drive gear 412. The power take-off gear 410 intermeshes with the flywheel 406. The drive gear 412 is supported on a common shaft 414 with the power take-off gear 410 and, as further detailed below, normally rotates with the gear 410. The drive gear 412 intermeshes with a step-up transfer gear 416 that is in turn fixed relative to a drive sheave 418 of the drive assembly 402. The drive gear 412 is rotatably supported on the shaft 414 by a concentric bearing assembly 420 so that, for purposes that will subsequently be described, the rotation of the shaft 414 is not translated to the gear 412.

The breakaway coupler assembly 408 couples the power take-off gear 410 and the drive gear 412 so that the gear 412 is normally drivingly coupled to the gear 410 but under predetermined conditions, as will be detailed below, the breakaway coupler assembly 408 enables the gears 410,412 to rotate—or cease to rotate—independently of each other. The breakaway coupler assembly 408 includes a coupler disc 422, a plurality of power take-off gear pegs 424, and a plurality of drive gear pegs 426. In more detail, the power take-off gear pegs 424 are fixed to the power take-off gear 410 (although for illustrative purposes, the pegs 424 are shown removed from the gear 410 in FIGS. 12 and 13) in any suitable manner, such as by welding or the like. The pegs 424 extend generally perpendicular from the gear 410 and are configured to engage the disc 422 generally adjacent the circumference of the disc 422. For purposes that will subsequently be described, the pegs 424 are further configured and dimensioned so as not to engage the drive gear 412. In a similar manner, the drive gear pegs 426 are fixed to the drive gear 412 and extend generally perpendicular therefrom to engage the disc 422. For purposes that will subsequently be described, the pegs 426 are radially offset from the pegs 424 so as not to engage the pegs 424 if and when the gears 410,412 rotate independently of one another. It is important that the pegs 424,426 are configured so as not to engage one another, however, this could be accomplished in a number of ways, such as dimensioning the pegs 424,426 so that neither group of pegs 424,426 extends beyond the longitudinal center of the disc 422.

The disc 422 is received between the gears 410,412 and shares the common shaft 414 therewith. However, it is not important whether the disc 422 is supported on the shaft 414 or spaced therefrom, as long as the shaft 414 does not interfere with the breakaway function of the disc 422 detailed below. The disc 422 is generally cylindrically shaped and is configured to receive the pegs 424,426 so that the gears 410,412 are normally drivingly connected by the disc 422 under a variable torsion force yet enables the gears 410,412 to drivingly disconnect to enable the gears 410,412 to rotate freely and independently of one another when the torsion force exceeds a predetermined value. This predetermined value will vary depending on the blower application, as well as the drive assembly utilized for the blower and the vehicle's engine specifications. However, the predetermined value should at least slightly exceed the normal operational range of moment forces on the gears, such as occasioned by acceleration and deceleration of the blower and engine. That is to say, a normal operational range of moment forces is the range expected when the blower is operating free of foreign material in the blower and drive assembly, the internal components of the blower, such as the bearings supporting the transmission and impeller, are fully operational (e.g., the impeller is not contacting the case, etc. In this regard, the illustrated disc 422 is formed from an elastomeric material presenting a sheer modulus sufficient to maintain the driving coupling between the gears 410,412 under normal operating conditions, yet substantially less than the sheer moduli presented by the gears 410,412 to enable the pegs 424,426 to shear through the disc 422 in the event of the air induction system locking up (e.g., catastrophic failure, etc.). The gears 410,412 are preferably formed from steel or some other iron alloy (e.g., presenting a shear modulus typically between fifty and one-hundred GPa). The disc 422 is preferably formed from plastic and one suitable plastic is available from the Dupont Company under the designation Hytrel® (e.g., having a shear modulus of less than 25 GPa). However, the disc 422 could be formed from materials other than plastic, such as synthetic rubbers (e.g., urethane, neoprene, etc.). In this manner, if the drive gear 412 ceases to rotate, such as when the air induction system catastrophically fails, the power take-off gear pegs 424 will shear through the disc 422 (without contacting the pegs 426) thus enabling the power take-off gear 410 to continue rotating with the flywheel 406. It will be appreciated that continued rotation of the gear 410 is highly desirable in that ceasing rotation of the gear 410 will likely in turn cause the flywheel 406 to cease rotation, which in turn can undesirably cause engine damage and the like. To a lesser extent, this breakaway coupling is desirable to prevent damage to the other components of the air induction system in the event the power take-off gear 410 ceases to rotate.

The breakaway coupler assembly 408 is particularly well suited for Harley-Davidson® motorcycles wherein the air induction system is powered off of the flywheel. That is to say, flywheels on these motorcycles are known to have a significant amount of play or "slop" and therefore have been thought to not be well suited for the tight tolerances demanded for driving a power take-off gear for a supercharger. However, the breakaway coupler assembly 408 provides a degree of safety, such as preventing damage to the remaining components of the air induction system and drive train, in the event the driving intermeshing of the power take-off gear 410 and the flywheel 406 is compromised. For example, the pegs 424 can shear through the disc 422 enabling the gear 410 to rotate freely with the flywheel 406. In this event, the disc 422 (and one or more of the flywheel 406 and the gears 410,412 if necessary) can simply be replaced without having to replace or repair the relatively more expensive air induction system components and drive train components. The breakaway coupler assembly 408 further enables the advantage of a relatively quieter drive assembly via the noise-dampening qualities of the elastomeric disc 422, as is desired from the typical Harley-Davidson® rider. However, the principles of this aspect of the present invention are not limited to any particular make of motorcycle and as indicated above, are not limited to motorcycles. It is also within the ambit of the present invention to utilize various alternative configurations for the breakaway coupler assembly. For example, the breakaway coupler assembly could be positioned between the supercharger drive sheave and the supercharger transmission, or between the supercharger transmission and the impeller. However, it is important that the assembly be positioned between the supercharger impeller and the engine component where the drive assembly takes power for the supercharger from and enable the drive components it couples together (e.g., gears, etc.) to rotate freely and independently of one another in the event the torsion forces therebetween exceed the normal operating conditions, such as are experienced in the event of a catastrophic failure of the air induction system.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A supercharged vehicle comprising:
a chassis;
an engine; and
an air induction system operable to deliver compressed induction fluid to the engine and including a supercharger and a supercharger drive,
said supercharger drive being drivingly connected relative to said engine and operable to supply power to said supercharger,
said supercharger drive including first and second rotatable drive members that cooperate to transfer driving power from the engine to the supercharger,
said supercharger drive further including a breakaway coupler assembly selectively interconnecting said drive members so that the members are normally drivingly connected by the coupler assembly under a variable torsion force,
said coupler assembly being configured to drivingly disconnect the members and enable the members to rotate independently of one another for at least one revolution when said torsion force exceeds a predetermined value,
said breakaway coupler assembly including a disc,
said first and second drive members being gears and each presenting a common rotational axis with said disc,
said coupler assembly further including a first pin projecting from said first drive gear into said disc and a second pin projecting from said second drive gear into said disc.

2. The vehicle as claimed in claim 1,
said first and second pins being radially offset from each other relative to the rotational axis.

3. The vehicle as claimed in claim 1,
said supercharger including a rotatable impeller operable to compress induction fluid for the engine when rotated.

4. The vehicle as claimed in claim 1,
said chassis being operable to be mounted by a rider and including a front wheel and a rear wheel longitudinally spaced from said front wheel,
said engine including a rotatable crankshaft spaced between said wheels.

5. The vehicle as claimed in claim 2,
said disc being formed from an elastomeric material presenting a sheer modulus substantially less than the sheer moduli presented by at least one of said first and second drive gears.

6. The vehicle as claimed in claim 3,
said supercharger drive including a supercharger transmission in driving communication with said impeller and a drive assembly in driving communication between said engine and said supercharger transmission.

7. The vehicle as claimed in claim 4,
said front and rear wheels being generally aligned.

8. The vehicle as claimed in claim 4; and
a drive train drivingly interconnecting said crankshaft and said rear wheel and including a rotatable driven element longitudinally spaced from said crankshaft and an endless element drivingly interconnecting said crankshaft and said driven element.

9. The vehicle as claimed in claim 8,
said first rotatable drive member drivingly intermeshing with one of said driven and endless elements.

10. A supercharged vehicle comprising:
a chassis:
an engine;
an air induction system operable to deliver compressed induction fluid to the engine and including a supercharger and a supercharger drive,
said supercharger drive being drivingly connected relative to said engine and operable to supply power to said supercharger,
said supercharger drive including first and second rotatable drive members that cooperate to transfer driving power from the engine to the supercharger,
said supercharger drive further including a breakaway coupler assembly selectively interconnecting said drive members so that the members are normally drivingly connected by the coupler assembly under a variable torsion force,
said coupler assembly being configured to drivingly disconnect the members and enable the members to rotate independently of one another for at least one revolution when said torsion force exceeds a redetermined value, said chassis being operable to be mounted by a rider and including a front wheel and a rear wheel longitudinally spaced from said front wheel, said engine including a rotatable crankshaft spaced between said wheels; and a drive train drivingly interconnecting said crankshaft and said rear wheel and including a rotatable driven element longitudinally spaced from said crankshaft and an endless element drivingly interconnecting said crankshaft and said driven element, said first rotatable drive member drivingly intermeshing with one of said driven and endless elements, said one of said elements being said driven element, said driven element comprising a flywheel.

11. The vehicle as claimed in claim 10, said breakaway coupler assembly including a disc, said first and second drive members being gears and each presenting a common rotational axis with said disc.

12. The vehicle as claimed in claim 10, said first and second rotatable drive members comprising gears, said supercharger drive further including a transfer gear drivingly intermeshing with said second rotatable drive gear.

13. The vehicle as claimed in claim 12, said supercharger drive further including first and second rotatable sheaves and an endless drive element drivingly entraining said sheaves, said first rotatable sheave being fixed relative to said transfer gear so that said first rotatable sheave is driven by said transfer gear.

14. The vehicle as claimed in claim 13, said supercharger including a rotatable impeller operable to compress induction fluid for the engine when rotated, said second rotatable sheave being fixed relative to said impeller.

* * * * *